Dec. 11, 1956 G. E. FAIRCHILD 2,773,567
DISC BRAKE ACTUATING MECHANISM
Filed June 8, 1953 2 Sheets-Sheet 1

INVENTOR.
GERALD E. FAIRCHILD,
BY
ATTORNEY.

Dec. 11, 1956     G. E. FAIRCHILD     2,773,567
DISC BRAKE ACTUATING MECHANISM
Filed June 8, 1953     2 Sheets-Sheet 2

INVENTOR.
GERALD E. FAIRCHILD,
BY
ATTORNEY.

United States Patent Office 2,773,567
Patented Dec. 11, 1956

2,773,567

DISC BRAKE ACTUATING MECHANISM

Gerald E. Fairchild, Altadena, Calif., assignor to Aircraft Brake Company, Carson City, Nev., a corporation of Nevada Application June 8, 1953, Serial No. 360,266

5 Claims. (Cl. 188—72)

This invention relates to improved brakes, typically adapted for use on a motor vehicle, and of the type generally referred to as "disc" brakes. More specifically, brakes embodying the invention are of a type including a pair of pressure plates or elements which are movable axially toward and away from each other, and an intermediate member or friction ring adapted to be functionally retained by the two elements against relative rotation.

A general object of the invention is to provide improved means for relatively axially moving the pressure plates or elements of such a disc brake toward and away from each other and against the intermediate friction member. Particularly contemplated is an arrangement in which forces are exerted against one of the pressure elements at a number of circularly offset locations, and the device is so designed as to automatically equalize the forces at these different locations.

For actuating one of the pressure elements toward the other and against an intermediate friction member, we may employ a plurality of levers adapted to act against one of the pressure elements at different locations. Two of these levers may be operated by a common actuating unit, typically a hydraulically or pneumatically actuated piston and cylinder mechanism, and in which case it becomes extremely important to equalize the force exerted by the actuating unit against the two levers. For this purpose, we provide force equalizing means between the actuating unit and levers, preferably comprising an element which is automatically shiftable to equalize the force. This element may be mounted for its shifting movement by providing it with a spherical bearing surface slidably engaging a correspondingly spherical surface on the actuating unit. Desirably, two actuating units and associated pairs of levers are employed, for acting against one of the pressure elements at four circularly spaced locations.

In order to prevent distortion of the pressure elements when the braking force is applied, we have found it desirable to provide backing means bearing in a reverse axial direction against the second of the pressure elements at a location or locations axially alined with the point or points at which force is exerted against the first element. This backing force may be exerted by one or more levers positioned at a side of the brake opposite the side at which the first mentioned levers are located. These second levers may then be connected to and actuable by an emergency brake control member, for exerting emergency braking force against the pressure element when the primary actuating units fail. Preferably, there are as many levers at one side of the brake as at the other side, and corresponding levers at the opposite sides are interconnected by joining links.

The above and other features and objects of the present invention will be better understood from the following detailed description of the typical embodiment illustrated in the accompanying drawings, in which:

Fig. 2 is a fragmentary view taken on line 2—2 of Fig. 1; and

Figure 1:
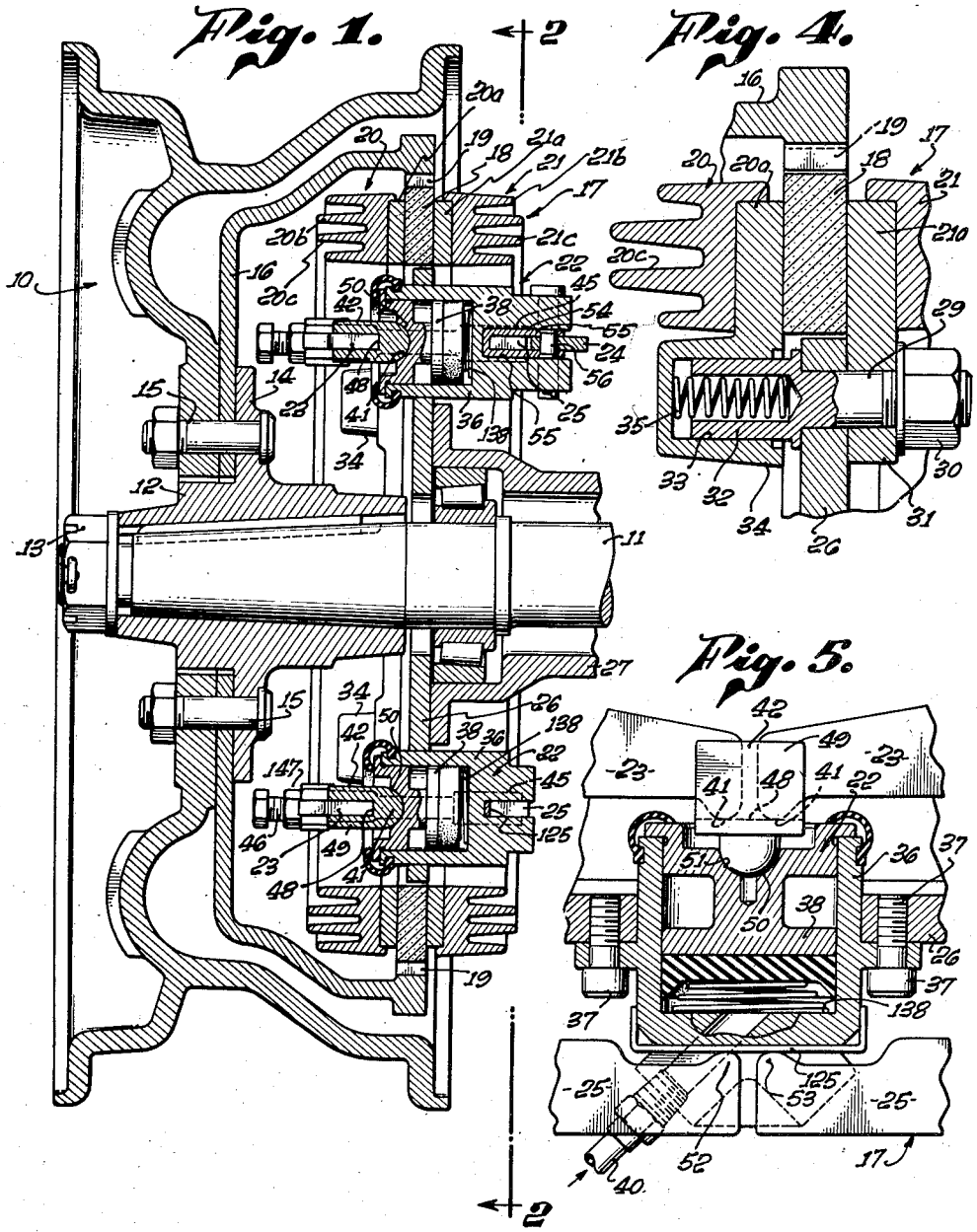
Fig. 1 is an axial section through a brake embodying the invention.

Figs. 3, 4 and 5 are sections taken on lines 3—3, 4—4, and 5—5 respectively of Fig. 2.

Referring first to Fig. 1, I have shown at 10 a conventional automobile wheel, which is mounted to the end of a rotary axle 11. Wheel 10 is attached to axle 11 by means of a mounting element 12, which is tightened onto the axle by a nut 13, and has a flange 14 carrying bolts 15 for attachment to the wheel. Element 12 also carries a hollow drum-like member 16, at the inside of which is positioned a brake mechanism 17, frictionally locking the drum and wheel against rotation.

Brake mechanism 17 includes a rotatable friction ring 18, formed of a suitable high friction brake lining material.

This friction ring is rotatably interlocked with drum 16 and the wheel by inter-engagement of axially extending teeth 19 on the outer surface of the friction ring and inner surface of the drum. The friction ring is adapted to be maintained against rotation by tightening of a pair of rigid pressure plates or rings 20 and 21 axially against opposite sides of the friction ring. Each of rings 20 and 21 may if desired be of one-piece construction, but preferably is formed sectionally of an inner annular portion 20a or 21a made of a rigid and relatively strong material such as cast iron, and an outer annular portion 20b or 21b formed of a highly heat conductive material such as aluminum and having annular heat dissipation fins 20c or 21c. The two sections of each of the rings 20 and 21 are rigidly bonded together in any suitable manner along their engaging surfaces. During normal operation of the brake, plate 20 is actuated toward and away from plate 21 by a pair of hydraulically or pneumatically actuated piston and cylinder mechanisms 22 through levers 23 at the outer side of the brake. Under emergency conditions, pressure plate 20 is actuated toward plate 21 by emergency brake lever 24 through lever 25 at the inner side of the brake.

The stationary parts of the brake mechanism included a central disc-like rigid plate 26 disposed about shaft 11 and stationarily mounted to a non-rotating member 27 carried by the vehicle. Plate 26 of course has a central opening through which shaft 11 extends, and may be attached to member 27 by a number of circularly spaced screws 28. The inner one of the two pressure rings, specifically the ring designated by the number 21, is rigidly attached to plate 26 by four circularly spaced screw-like elements 29, the inner ends of which carry nuts 30. Screw-like elements 29 may extend through radially inwardly projecting attaching lugs 31 on the ring 21.

The outer pressure ring 20 is guided for only axial movement relative to ring 21 by reception of outer externally cylindrical portions 32 within guide bores 33 in a number of circularly spaced portions 34 of ring 20. The ring 20 is normally urged axially away from stationary ring 21 by four coil springs 35 received within the hollow portions 32 of screw-like elements 29, and bearing axially against portions 34 of ring 20.

The two piston and cylinder mechanisms 22 include cylinder bodies 36 attached to plate 26 by screws 37 at diametrically opposite upper and lower positions, as shown. Each of these cylinder bodies 36 extends through an opening in plate 26, and contains a piston 38, which is actuable axially of the brake by the pressure of fluid within the cylinder, and may be urged lightly in a brake actuating direction by a light spring 138. Pressure fluid, typically a liquid, is delivered to one of these cylinders through a line 39, leading from the master cylinder or other brake control mechanism of the vehicle. The pressure of this fluid is communicated to the other cylinder through a line 40.

Associated with each of the cylinders 36, are two of the previously mentioned inner levers 23, having rounded proximately positioned first ends 41, against which piston 38 exerts axial force through a pressure equalizing element 42. These levers 23 extend in directly opposite directions from their point of engagement with element 42, and are individually fulcrumed at 43 and 44 by pivotal attachment to a pair of axially extending links 45. The second ends of levers 23 carry adjusting screws 46, whose spherical ends bear at 47 against spherically recessed portions of sections 20a of the pressure ring 20. As will be understood, screws 46 are threadedly connected into levers 23, to be axially adjustable relative to the levers, and tightenable in any set position by lock nuts 147.

Pressure equalizing element 42 has a planar axially outwardly facing surface 48, against which rounded ends 41 of levers 23 bear. Outwardly beyond this face, element 42 has a pair of spaced parallel side walls 49, which slidably engage opposite sides of levers 23 to maintain element 42 against lateral movement relative to the levers. At its inner end, element 42 has a spherically rounded lug 50, which is movably received within a correspondingly spherical recess 51 in piston 38, to permit universal swinging movement of element 42 relative to the piston. As will be appreciated, element 42 automatically shifts relative to piston 38 to compensate for any variations in adjustment of the two screws 46, so that the two levers 23 exert equal forces against ring 20.

The inner ends of the two links 45 associated with each cylinder are pivotally connected at 52 to a pair of levers 25 positioned at the inner side of the brake mechanism. These levers 25 are constructed essentially the same as, and extend parallel to, levers 23. The two levers 25 associated with the upper cylinder have rounded proximately positioned first ends 53, which bear outwardly against an emergency brake applying element 54, which in turn bears outwardly against the associated cylinder 36. Element 54 comprises a U-shaped member having a flat portion interposed between lever ends 53 and the cylinder, and having a pair of side portions 55 extending outwardly along opposite sides of the levers. The outer ends of arms 55 of element 54 are pivotally attached at 56 to lever 24, which is also pivotally attached at 57 to the stationary cylinder body 36. Swinging movement of lever 24 between its full-line and broken-line positions of Fig. 3 moves element 54 away from engagement with cylinder 36, to actuate levers 25 also away from the cylinder with resultant axial displacement of links 45 in a direction actuating pressure ring 20 axially toward ring 21 and into braking engagement with friction ring 18. In order that such actuation of levers 25 may displace links 45 in the desired manner, the second ends of levers 25 carry adjusting screws 58, whose spherical ends 59 bear axially against stationary pressure ring 21 at points directly axially alined with the points of engagement of outer adjusting screws 46 with ring 20. The proximate ends of the lower levers 25 exert force against the inner side of the lower cylinder, by engagement with a strap 125 carried by the cylinder.

The levers 23 and 25 associated with the upper cylinder 36 preferably extend parallel to the corresponding levers associated with the lower cylinder. It has been found desirable that all of these levers extend substantially horizontally, as shown.

Describing now the operation of the illustrated brake mechanism, when the brake is not applied, movable pressure ring 20 is actuated axially away from stationary ring 21 by springs 35, to free friction ring 18 for rotation relative to rings 20 and 21, so that the wheel 10 may rotate. If it is desired to stop the vehicle, a driver actuates the brake pedal, to supply pressure fluid to cylinders 36 through line 39. This pressure fluid actuates pistons 38 simultaneously outwardly, to swing levers 23 about their fulcrum points 43, and thus displace ring 20 axially toward ring 21. Such movement of ring 20 frictionally locks ring 18 against rotation, to stop the rotation of wheel 10. Subsequent release of the fluid pressure allows return of pistons 38 to positions in which friction ring 18 and the wheel are again freed for rotation. In the event of failure of the hydraulic actuating mechanism, the emergency brake control cable may be pulled, to swing lever 24 in a manner swinging levers 25 about their points of engagement at 59 with ring 21, to thus actuate links 45 and levers 23 for axially moving ring 20 into braking engagement with friction ring 18.

It is particularly noted that, when the brake mechanism is actuated by piston 38, the force applied axially against ring 20 is equalized as between the four points of engagement of adjusting screws 46 with that ring. More specifically, the force exerted by the two pistons is equalized by forming the pistons of equal dimensions, and supplying them with actuating fluid at a common pressure. Further, the force exerted by the two levers 23 associated with each of the individual pistons 38 is equalized by the previously described automatic shifting of equalizing element 42.

I claim:

1. A brake comprising two elements and a relatively rotatable member received axially therebetween, said elements being relatively axially movable toward and away from a position in which they engage said member and frictionally retain it against said relative rotation, a first pair of levers positioned at a first axial side of said elements and acting to displace one of said elements toward the other, an actuating unit operable to actuate both of said levers, a second pair of levers at a second side of said elements and operable to displace said elements relatively together, two axially extending links interconnecting said first and second levers, and emergency brake operating means operable to actuate said second pair of levers, said emergency brake operating means comprising an additional lever unit acting against a pair of proximately positioned ends of the levers of said second pair.

2. A brake comprising two elements and a relatively rotatable member received axially therebetween, said elements being relatively axially movable toward and away from a position in which they engage said member and frictionally retain it against said relative rotation, a cylinder and relatively axially movable piston, a first pair of levers positioned at a first side of said elements and operable to actuate one of said elements toward the other, said levers having proximately positioned relatively movable ends actuable by said piston, a second pair of levers at the second side of said elements having proximately positioned ends exerting force against said cylinder and having second ends bearing against a second of said elements, a pair of links connecting said first levers respectively with said second levers at locations intermediate the ends thereof, a force equalizing member interposed between said ends of said first levers and said piston and acting to automatically equalize the force exerted against said first levers by the piston, and a movable member operable to move said proximate ends of the second levers away from said cylinder and thereby causing said second levers to actuate the first levers for moving said elements relatively together.

3. A brake comprising two elements as recited in claim 2, in which said piston has a spherical recess, and said force equalizing member has a spherical portion received in and movable relative to said recess.

4. A brake comprising two elements and a relatively rotatable member received axially therebetween, said elements being relatively axially movable toward and away from a position in which they engage said member and frictionally retain it against said relative rotation, two relatively movable levers pivotable about individual axes and operable to relatively axially displace said elements, a common actuating unit acting against both of said levers to effect said relative axial displacement of said elements, said actuating unit including a cylinder and a piston actuable relative to the cylinder by fluid pressure to actuate said levers, and an equalizing element operatively interposed between said piston and said levers and adapted to automatically shift relative thereto to equalize the forces exerted by the unit against the levers, said piston and said equalizing element having engaging essentially spherical surfaces guiding the equalizing element for said shifting movement.

5. Apparatus as recited in claim 4, in which said equalizing element contains a recess within which end portions of said levers are received and guided in closely spaced relation, said levers being free of any direct attachment to said equalizing element restraining the levers against movement outwardly from said recess and away from force transmitting engagement with said equalizing element.

References Cited in the file of this patent

UNITED STATES PATENTS

| | | |
|---|---|---|
| 1,565,841 | Alden | Dec. 15, 1925 |
| 1,673,713 | Smith | June 12, 1928 |
| 1,978,974 | Williams | Oct. 30, 1934 |
| 2,115,083 | Pierce | Apr. 26, 1938 |
| 2,242,049 | Ash | May 13, 1941 |
| 2,266,059 | Milan | Dec. 16, 1941 |
| 2,280,599 | Milan | Apr. 21, 1942 |
| 2,371,158 | Eby | Mar. 13, 1945 |
| 2,567,157 | Tack et al. | Sept. 4, 1951 |
| 2,672,956 | Webb et al. | Mar. 23, 1954 |

FOREIGN PATENTS

| | | |
|---|---|---|
| 654,894 | Great Britain | July 4, 1951 |